United States Patent [19]

Spellman

[11] 3,801,373
[45] Apr. 2, 1974

[54] MINIATURE DRY CELL BATTERY

[76] Inventor: Patrick J. Spellman, Box 8109, Middletown, Wis. 19101

[22] Filed: Apr. 17, 1972

[21] Appl. No.: 244,395

[52] U.S. Cl. ................ 136/109, 136/111, 136/173
[51] Int. Cl. .......................................... H01m 21/00
[58] Field of Search .......... 136/108, 109, 111, 173, 136/175, 132, 134 P, 135 R, 166; 206/46 BA

[56] References Cited
UNITED STATES PATENTS

| | | | |
|---|---|---|---|
| 3,655,452 | 4/1972 | Cich | 136/111 |
| 1,823,066 | 9/1931 | Shapiro | 136/109 |
| 1,641,685 | 9/1927 | Meisekothen | 136/109 |
| 3,078,329 | 2/1963 | Granger | 136/108 |
| 3,110,634 | 11/1963 | Bradshaw | 136/173 |

*Primary Examiner*—Anthony Skapars

[57] ABSTRACT

A dry cell battery construction suitable for providing multi-cell voltages in extremely small size is described. The construction uses a multi-cell container body to which are permanently fastened a cover member and a bottom member. Cell elements placed in each individual compartment are interconnected by connector means formed as a part of the cover and bottom members. The container body, cover and bottom together form the individual cell containers and no other cell containers are used in the assembly. Means for providing intermediate voltage taps may be included as a part of the construction.

8 Claims, 3 Drawing Figures

PATENTED APR 2 1974  3,801,373
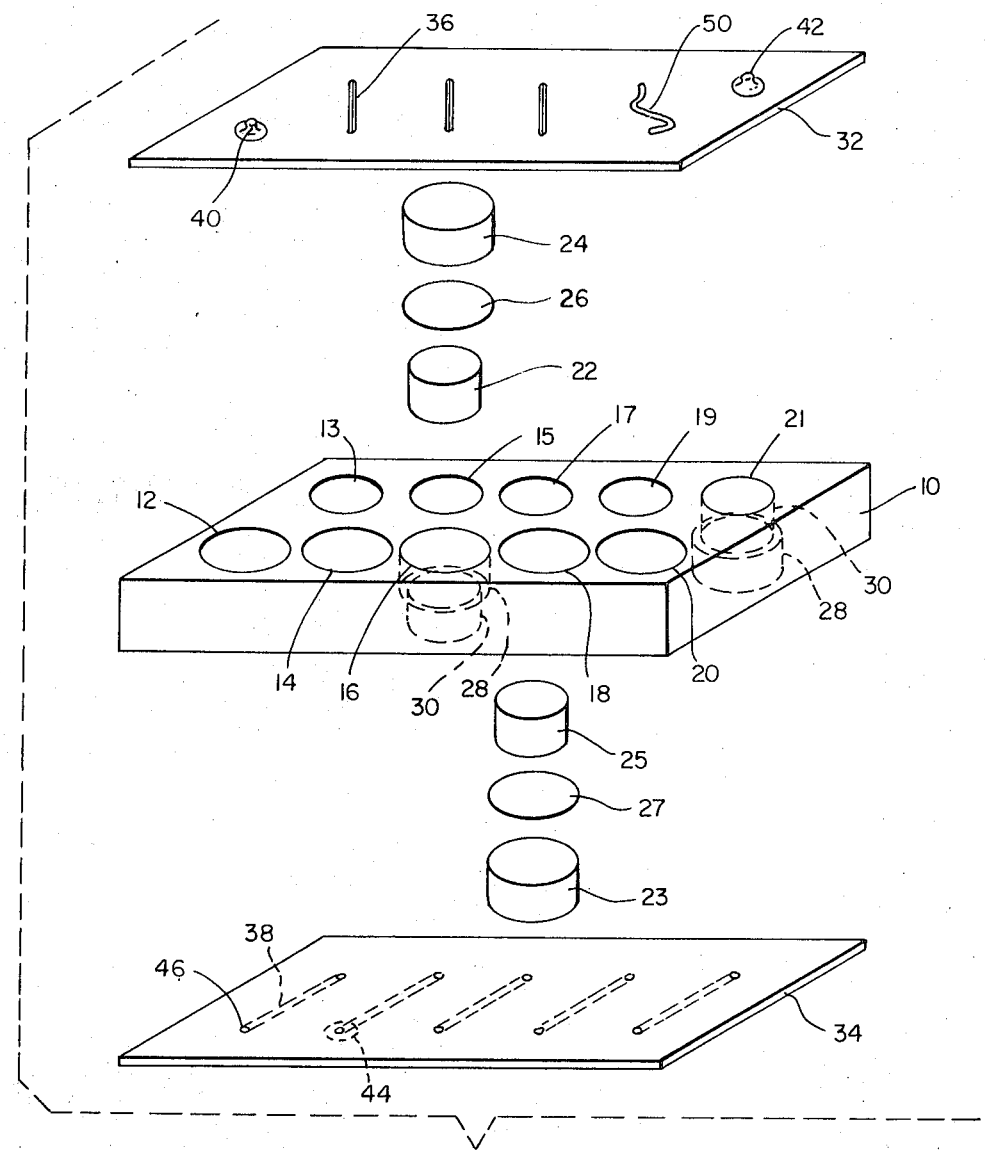
_Fig. 1_
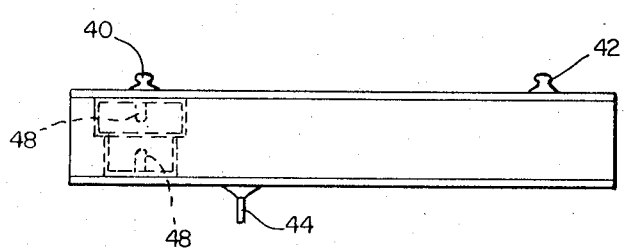
_Fig. 2_
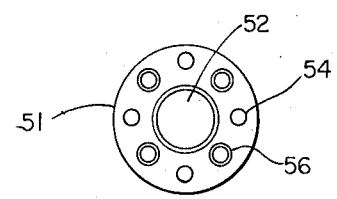
_Fig. 3_

MINIATURE DRY CELL BATTERY

BACKGROUND OF THE INVENTION

1. Field of the Invention

This invention relates to primary galvanic batteries. In particular the invention relates to small multi-cell primary batteries.

2. Description of the Prior Art

The classical and universal construction of dry cell batteries comprise individual cells, often enclosed in metal containers built as entities and then connected together to form a battery. In general the cells are connected in series to give a battery voltage equal to the sum of the individual cell voltages. The assemblage of cells is placed in a container often with potting compound so as to present a convenient portable battery package. The manufacture of individual cells in metal containers has reached a high state of perfection. Such cells have been miniturized in a construction known as a button cell so that a market product can now be found as small as about 1/10 inch diameter and about 1/10 inch high. Multi-cell batteries have been built using such miniature cells. The assembly requires about the same labor as is required to build a much larger battery, say of flashlight cells. Thus the assembly cost is completely out of line compared to the battery size. With the advent of the transistorized radio, a market for small multi-cell dry batteries developed. To meet this market, miniature cells of the "flat" dry cell variety were developed. These cells are wrapped in paper or paper like materials and are made as small as approximately ½ inch × ½ inch × 1/10 inch thickness. The construction is suitable for mechanical assembly, and these batteries, usually having six cells to give 9 volts, are now being made in quantity on fully automatic assembly lines.

The electronic watch of the type using a tuning fork opened a new market for small dry batteries. For technical reasons it was soon found that a single cell battery of the button configuration provided the best power source. To meet this market, button cells housed in steel cans are available. The usual size is about ⅜ inch diameter by 1/10 inch in thickness. A new form of electronic watch has recently been developed. Its accuracy is reported to be within a few seconds per month. This type of watch uses a completely electronic mechanism. The electrical requirements call for a dual voltage battery. The low voltage portion requires one or two cells with a comparatively high ampere hour capacity for operation of the basic time measuring circuiting and a comparatively high voltage source up to perhaps 10 cells of a much lower ampere hour capacity to produce an illuminated time read-out. Some of the other requirements for the battery are that it have a long shelf life, that it must develop the maximum power storage ability possible for its size and that it does not leak dangerous chemicals even when subject to mechanical shock, temperature extremes, etc.

The circuitry of this new watch is built upon the miniaturized chip technology. The entire electronic mechanism is not much larger than the balance wheel of a normal men's wrist watch. Batteries built using present day technologies have been found to be overly large and overly costly to be in keeping with the rest of the watch. There is thus a need of a new technology for the production of extremely small high voltage batteries of good electrical capacity and reasonable cost.

SUMMARY OF THE INVENTION

A dry cell battery comprising a multi-cavity container body with a cell element located in each cavity without other cell container means has permanently attachable container cover and container bottom. The polarity of each element is positioned so that adjacent cells locate their electrodes in an array alternately positive and negative. Intercell connections as well as terminals form a part of the container top and bottom, so that as these parts are secured to the container body the circuitry of the battery is completed. Intermediate tap-offs from the battery are provided. A bank of large cells (in comparison to the rest of the battery) can be provided to match the electrical requirements of the time keeping mechanism. Hydrogen gas evolved from a certain class of cell anodes may be dissipated by the transfusion of the gas through the container top and bottom members, thus preventing rupture and leakage of electrolyte from the battery.

BRIEF DESCRIPTION OF THE DRAWINGS

FIG. 1 depicts in an expanded view the parts used to make a 10 cell battery;

FIG. 2 depicts the assembled battery using parts as shown in FIG. 1; and

FIG. 3 depicts a second embodiment of the invention.

DESCRIPTION OF THE PREFERRED EMBODIMENTS

In FIG. 1, 10 depicts an oversize view of a ten compartment battery container. This is made from a plastic or non conductive material having structural strength, dimensional stability and impervious to the chemicals used in the cell system. It must also be cementable or weldable. Suitable materials include methacrylate, styrenes, polyvinyl chlorides, polyolefins, polyamides, polyesters, ceramics, etc. Compartments 12 to 20 provide locations for 10 cell elements. Typical cell elements are shown for cell 16 and 17. The elements comprise a cathode 22, 23 an anode 24, 25 and a separator 26, 27. Electrolyte (not shown) is absorbed in pores in the cathode, anode and separator. Certain of the cathodes and anodes listed above are conveniently made by pressing dry powders into a pellet. In others, it may be convenient to press the powder into a small metal recepticle.

In a typical assembly and that used in the battery of FIG. 1, the cathode is somewhat larger than the anode. Compartments 28 are provided for cathode and smaller compartments 30 are provided for the anode. The separator is made the same diameter as the cathode and is firmly pinched between cathode and the container.

In order to obtain full battery voltage the cells are connected in series. In the cell arrangement shown in FIG. 1, cell 12 connects to cell 13 and cell 13 to 14 and so on to cell 21. Each cell having a nominal voltage of say 1.5, the battery voltage is 15 volts. Cells 12, 14, 16, 18 and 20 are assembled with cathodes toward the top of the assembly as shown and anodes toward the bottom. Cells 13 to 21 are assembled with their cathodes toward the bottom and anodes toward the top.

A cover member 32 and bottom member 34 complete the components of the battery. The container, the cover member and the bottom member together form individual containers for the cells as well as forming the battery. Each cell element without other cell container means is located within the compartment included for it in the multicompartment container. The absence of individual cells with individual containers as described as present practice in the Background forms a principal feature of the present invention. Intercell connector means 36, 38 and terminals 40, 42 and 44 are formed on the cover and bottom members as required. The intercell connectors may be located on the cell side of the cover and bottom members or they may be located on the side of the members away from the cells. In the construction shown they are located on the sides away from the cells. When this construction is used, it is necessary to provide a current path through the cover and bottom members. This connection may be provided by means such as a rivet, as insert molded in the cover or bottom member or other means. It is necessary in this construction that the connection be sealed in liquid tight relationship to the cover or bottom member otherwise electrolyte may work through and possibly reduce the capacity of the battery. On the cell side of the cover and bottom means the connector may end in a flat contact as at 46 or it may extend into the cathode or anode, as shown at 48. The intercell connector means such as 36, 38 may be individual pieces of metal fastened to the contact pieces. However, they may advantageously be made by printed circuit techniques as presently known in the art. The intercell connectors may also be formed on the cell side of the cover and bottom members. In this case, it is important that the seal from cell to cell is made in permanent liquid-tight fashion. Connector 38 serves to connect the anode of cell 1 to the cathode of cell 2. The connector 36 serves to connect the anode of cell 2 to the cathode of cell 3. The construction shown wherein the cathode of a first cell element is adjacent the cover member, the anode of the first cell element is adjacent the bottom member, the cathode of a second cell element is adjacent the bottom member and the remaining elements being in successive anode adjacent the bottom member and anode adjacent the cover member configuration, permits of a simple and direct intercell connector layout. Terminals such as shown at 40 and 42 are located at the voltage extremes of the battery. If it is required to provide an intermediate voltage, an intermediate terminal such as that shown at 44 may be provided. The terminal form of 40 and 42 is a snap button. That at 44 is a pin. Other terminal shapes as known in the art may be used.

At 50, a variation of the intercell connection means is shown. In this case, it is in a zig-zag shape, increasing its length and increasing the leakage path from cell to cell.

When the several cell elements are properly located in the container 10, the cover member 32 and the bottom member 34 are placed thereon and firmly and permanently fastened to the container as shown in FIG. 2.

In FIG. 3, 51 represents the container for a second embodiment of the battery. In this case it is a 9 cell battery having a large cell 52 in the center surrounded by 8 small cells 54, 56. As in the example of FIGS. 1 and 2, cells are arranged in cathode up and down array. The cell 52 provides a low voltage power source of high capacity for operating the time keeping portion of a watch and cells 54, 56 provide a high voltage battery of low capacity for a read-out circuit.

Typical dimensions of a ten cell rectangular battery are: 0.9 inch length, width 0.4 inch, height 0.19 inch, and of a battery like FIG. 3, diameter 1.0 inch, height 1/8 inch.

As in all dry cell technology, it is important in this assembly to have the cell elements under longitudinal (from anode to cathode) pressure so as to establish and maintain ionic and electronic contact between the several cell parts and to the intercell connector areas. In the present design this is achieved by careful control of the thickness of the container body, the thickness of the anode, cathode and separator and in certain cases by the use of a resilient separator such as synthetic felt.

It is to be understood that the electrical requirements of a miniaturized chip technique electronic circuit are orders of magnitude smaller than any usual electrical or electron mechanical circuit. The power requirements for the electronic watch differ materially from earlier electical watches.

The seals between battery container and cover and bottom are made by normal techniques suitable for their composition. For example with styrene, a solvent seal is used, for polyolefins a heat seal, etc. It is important that all seals be liquid tight, particularly the seal between adjacent cells.

With a certain class of anodes, particularly those using zinc, a gas evolution problem exists. To minimize the gas evolution, it is customary to treat the zinc metal with mercury or other chemicals. However, in spite of this a zinc negative may produce hydrogen gas. Most present day dry cells provide mechanical means for dissipating the hydrogen as it is formed. In the case of the miniature cells of the invention, it is not possible to provide reliable individual mechanical vents in the available space. However, it is known that the classes of plastics listed above when in thin section are permeable to hydrogen gas while at the same time being relatively impermeable to water vapor. It is a part of the invention to make use of such plastics so as to further the miniaturization of the battery while still providing the reliability and freedom from leakage demanded by the applications for which this battery is intended.

Having thus fully described the battery of my invention and shown how it differs from other batteries known to the art, I hereby claim:

1. A multi-cell dry cell battery which comprises:
   a. a plurality of cell elements, each cell element comprising an anode, a cathode, separation means and electrolyte;
   b. a non conductive multi-compartment container having a top and a bottom and including a compartment for each cell element;
   c. a non conductive multi compartment cover permanently attached to the top of the container;
   d. a non conductive multi-compartment bottom member permanently attached to the bottom of the container;
   e. cell connecting means and terminal means formed integrally with the cover member and the bottom member;
   f. the container, the cover member and the bottom member together forming individual containers for the cells; and,
   g. each cell element without other cell container means being located within the compartment included for it in the multi-compartment container.

2. A multi-cell dry cell battery as defined in claim 1 wherein the anode of a first cell element is located adjacent the cover member, the cathode of the first cell element is located adjacent the bottom member, the anode of a second cell element is located adjacent the bottom member and the cathode of the second cell element is located adjacent the cover member, the remaining cell elements being located in successive anode adjacent cover member and anode adjacent the bottom member configuration.

3. A multi-cell dry cell battery as defined in claim 2 wherein a negative terminal means connects to the anode of the first cell element and a positive terminal means connects to the cathode of a last cell element.

4. A multi-cell dry cell battery as defined in claim 3 wherein an intercell connector means located on the bottom member connects the cathode of the first cell element to the anode of the second cell element, an intercell connector means located on the cover member connects the cathode of the second cell element to the anode of a third cell element and additional intercell connector means located successively on the bottom member and the cover member serve to connect the remaining cells elements serially into a multi-cell battery.

5. A multi-cell dry cell battery as defined in claim 4 wherein at least the first cell element of the battery is larger in ampere hour capacity than other cell elements of the battery.

6. A multi-cell dry cell battery as defined in claim 5 wherein a terminal means connects to the intercell connector connecting a cell element of larger ampere hour capacity to a cell element of small ampere hour capacity.

7. A multi-cell dry cell battery as defined in claim 6 wherein the open circuit voltage is no less than 6 volts, the diameter of the container body is no greater than 1.0 inch and the thickness of the container body with cover to bottom attached is no greater than ⅛ inch.

8. A multi-cell dry cell battery as defined in claim 5 wherein the container top member and the container bottom member is permeable to hydrogen gas and essentially impermeable to water vapor.

* * * * *